United States Patent [19]

Kraus

[11] 4,167,338

[45] Sep. 11, 1979

[54] METHOD AND APPARATUS FOR DETERMINING THE QUANTITY RATIO OF TWO COMPONENTS OF A MULTI-SUBSTANCE MIXTURE

[75] Inventor: Thaddaus Kraus, Triesen, Liechtenstein

[73] Assignee: Balzers Patent- und Beteiligungs Aktiengesellschaft, Liechtenstein

[21] Appl. No.: 831,134

[22] Filed: Sep. 7, 1977

[30] Foreign Application Priority Data

Sep. 14, 1976 [CH] Switzerland ............... 11626/76

[51] Int. Cl.$^2$ ........................... G01J 3/42; G01J 3/48
[52] U.S. Cl. ................................ 356/414; 356/418; 356/419
[58] Field of Search ............... 356/186, 188, 416, 417, 356/418, 419

[56] References Cited

U.S. PATENT DOCUMENTS

| 2,834,246 | 5/1958 | Foskett et al. | 356/188 |
| 4,082,464 | 4/1978 | Johnson | 356/188 |

*Primary Examiner*—John K. Corbin
*Assistant Examiner*—Bruce Y. Arnold
*Attorney, Agent, or Firm*—McGlew and Tuttle

[57] ABSTRACT

A method for determining the quantity ratio of two components of a multi-substance mixture whose absorption bands are adjacent to each other and overlap comprises using an interference filter which is rotated in a uniform rotation about a first axis through the filter plane which forms with a perpendicular erected on the filter plane a fixed angle $\beta$ which is not equal to zero. The filter is rotatably arranged about a second axis through the filter plane and the method is characterized by adjusting the angle $\alpha$ which the axis of rotation forms with the ray in the range of $\beta$ is less than $\alpha$ so that a signal corresponding to the first derivative of the spectral intensity distribution of the radiation transmitted by the substance mixture just passes through zero and a quantity correlated with this angle is used as a measure of the quantity ratio. The radiation modulator for determining the quantity ratio includes a housing having an opening for the passage of the light ray therethrough and a filter in the housing in the path of the beam. The filter is mounted for rotation about a first axis comprising the axis of the filter and is mounted for pivoting about a second axis also going through the filter. The first axis is such that the area normal thereof forms with the first axis a fixed angle $\beta$ and the first axis is rotatable about the second axis and an angle $\alpha$ is formed between the first axis in the ray direction which may be read and indicated and the filter is adjustable to vary the angle.

4 Claims, 6 Drawing Figures

METHOD AND APPARATUS FOR DETERMINING THE QUANTITY RATIO OF TWO COMPONENTS OF A MULTI-SUBSTANCE MIXTURE

BACKGROUND OF THE INVENTION

Field of the Invention

The problem of seeking a parameter which indicates directly the quantity or mass ratios of substance pairs in multicomponent mixtures arises based on the realization that the ratio of the quantity of mass of one substance to the quantity of mass of a second substance, rather than the ratio of the quantity or mass of this substance to the quantity or mass of all substances contained in the mixed phase, is determining for chemical reactions and equilibria.

The quantity or mass ratio was formerly determined from the ratio of the contents or from the ratio of the concentrations of the two substances, depending on whether the parameter used depends on the mass, the quantity or the volume of the sample. A direct parameter of the mass or quantity ratio of two substances, i.e. one independent of mass, quantity and volume of the sample, was not known until a short while ago.

To determine the concentrations of the two substances, for example, on the basis of the substance dependence of the spectral intensity distribution of the radiation transmitted by the sample, one used to measure the radiation intensity or its first, second or a higher derivative at at least two different points of the spectrum.

For these two measurements, separated in space or time, it was necessary to measure or to maintain constant the sample quantity or the sample volume, the pressure and the temperature, and to eliminate disturbing components. These measures though necessary when using a parameter which depends on the absolute amount of the two substances, are not necessary when using a parameter which depends exclusively on their ratio.

In DT-OS 2,460,895 a measuring method was described for the first time which furnishes direct parameters for the quantity of mass ratio of two components of a mixed phase which correspond to the first and second difference $\Delta^1 J/\Delta^2 J$ or respectively to the ratio of the first and second derivative $J'/J''$ of the spectral intensity distribution. These parameters have the advantages that they reproduce with great accuracy especially the small deviations from that mixture ratio at which the first difference $\Delta^1 J$ or respectively the first derivative $J'$ is zero, and that they are independent of the absolute amounts of the substance quantities in the ray path and therefore are not adversely influenced either by dilution with other substances or by a variation of the pressure or the temperature, or by a variation of the intensity of the radiation source or by smoke and dust. However, the measurement range in which these advantages are effective is relatively small in this method.

In U.S. Pat. No. 2,834,246 an apparatus for the modulation of a measuring light ray by means of a rotating interference filter has been described. On the basis of this publication it was to be expected that one can adjust the mean value of the wavelength of the transmitted light by means of the angle which the axis of rotation forms with the perpendicular erected on the filter. Applicant's experiments with the known apparatus, however, could not clearly confirm this.

SUMMARY OF THE INVENTION

The invention provides a new method which furnishes a direct parameter for the mass or quantity ratio of two substances, independent of the mass, quantity and volume of the sample, and which preserves the advantages of the prior art, in particular the independence from dilution, pressure, temperature and radiation intensity, but avoids the disadvantage of a smaller measurement range.

The invention further provides an arrangement as simple and operationally safe as possible with which that point in the spectral range between the adjacent absorption bands of the two components can be adjusted and read very accurately and at which the first derivative of the spectral intensity distribution of the radiation transmitted by the substance mixture passes through zero.

A method according to the invention for the determination of the quantity ratio of two components of a multi-substance mixture, whose absorption bands are adjacent to each other and overlap, and wherein an interference filter is subjected to a uniform rotation about a first axis through the filter plane which forms with a perpendicular erected on the filter plane a fixed angle, beta $\neq 0$, and which is rotatably arranged about a second axis through the filter plane, is characterized in that the angle alpha which the axis of rotation forms with the ray is so adjusted in the range beta $<$ alpha that a signal corresponding to the first derivative of the spectral intensity distribution of the radiation transmitted by the substance mixture just passes through zero and a quantity correlated with this angle is used as measure of the quantity ratio.

It has been found that this parameter can be adjusted and read very easily—which offers a particular advantage in metrology—and that it can indeed be used as a measure of the quantity ratio of two components of a multi-substance mixture in a much greater range of the quantity ratio than the above-mentioned known method for the direct measurement of said ratio.

The invention is based on the finding that the quantity or mass ratio of a substance pair is given by that point in the spectral range between the overlapping absorption bands of the two substances at which the first derivative of the spectral intensity distribution of the transmitted radiation disappears.

If $J_O$ is the luminous flux incident in an absorbing substance mixture, and $J$ an observation value of the transmitted luminous flux of a certain wavelength, then, Lambert's absorption law being valid, the quotient of these two principal quantities can be expressed by the formula $$\ln J/J_o = -m_A \cdot kappa_A - m_B \cdot kappa_B + gamma \qquad (1)$$

where $m_A$ and $m_B$ are the quantities or masses of the two components present in the ray path, $kappa_A$ and $kappa_B$ the extinction coefficients of the two substances referred to quantity or mass units, and gamma the sum of apparatus-related factors, which may be positive or negative.

The so-called derivative photometry is based on the finding that although the amounts $kappa_i$ are independent of the respective substance quantities $m^i$, they vary more or less strongly with the wavelength of the light depending on the type of substance.

Accordingly we may write for the first derivative of ln J with respect to the wave number, nu $$d(\ln J)/d\nu = J'/J_o = -m_A \cdot \kappa_A' - m_B \cdot \kappa_B' + \gamma'. \quad (2)$$

gamma' may be positive or negative; $\kappa_i$ is zero in the absorption maximum of the respective substance, positive at smaller wave numbers, negative at higher ones, and tends toward zero again with increasing distance from the absorption maximum.

By varying the wave number, one can find a point at which $$\kappa_B'/\kappa_A' = -m_A/m_B \quad (3)$$

According to equation 2 we then have $$J' = \text{gamma}' \times J. \quad (4)$$

If in addition, e.g. indexing a suitable filter, one sees to it that $$\text{gamma}' = 0 \quad (5)$$

then we always have at this point $$J' = 0 \quad (6)$$

regardless of the magnitude of the luminous flux J.

Of the known methods for measuring the first derivative the most advantageous for the purpose of the invention proves to be the one where the measuring radiation passes through an interference filter under an angle which periodically varies about a mean value. The intensity distribution of the transmitted radiation then undergoes a sinusoidal modulation of its wavelength.

From the alternating current which the transmitted radiation generates in a radiation-sensitive receiver one then obtains in known manner an electric variable dependent on the first derivative which can be indicated visually or acoustically. An advantageous method of periodically varying the angle under which the ray to be modulated impinges on the interference filter is to subject the filter to a uniform rotation about an axis through the filter which forms an angle alpha with the ray and an angle beta with a perpendicular on the filter plane.

Accordingly, it is an object of the invention to provide an improved method for determining the quantity ratio of two components of a multisubstance mixture which has light absorption bands which are adjacent to each other and overlap by using an interference filter which comprises rotating the interference filter in a uniform rotation about a first axis through the filter plane which forms with a perpendicular erected on the filter plane a fixed angle beta which is less than zero and which is rotatably arranged about a second axis through the filter plane, adjusting the angle alpha which the axis of rotation forms with the ray in the range of beta is less than alpha so that a signal corresponding to the first deviative of the spectral intensity distribution of the radiation transmitted by the substance mixture just passes through zero, using a quantity correlated with this angle as a measure of the quantity ratio.

A further object of the invention is to provide a radiation modulator for determining the quantity ratio of two components from a multi-substance mixture which comprises a housing having an opening for the passage of a light ray therethrough, a filter disposed in the light ray path of the housing, means of mounting the filter for rotation about a first axis which comprises the axis of the filter and for pivoting it about a second axis also going through the filter and wherein the first axis is such that the area normal thereto forms with said first axis a fixed angle beta and the first axis is rotatable about the second axis the angle alpha being formed by said first axis in the ray direction and including means for indicating the angle alpha and for adjusting the filter to vary the angle alpha.

A further object of the invention is to provide a radiation modulator which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference should be had to the accompanying drawing and descriptive matter in which there are illustrated preferred embodiments of the invention.

GENERAL DESCRIPTION OF THE PREFERRED EMBODIMENTS

Figure 1:
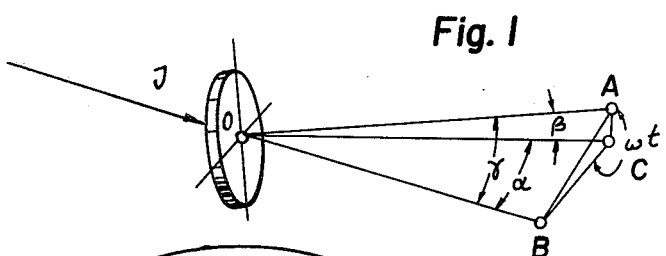
FIG. 1 is a schematic view of a filter indicating a light beam passing therethrough.

Referring to the drawings, FIG. 1 indicates, in schematic representation, the determining angles between the direction of the measuring light ray, the axis of rotation, and the filter normals; OA is the perpendicular on the filter, OB the measuring ray, and OC the axis of rotation.

In the simplest case, the interference filter can be attached at the shaft butt of a motor, and the ray to be modulated passes through the filters. For example, see J. A. Harrison and C. D. Reid. Infra-red absorptiometer, using interference filters for analysis of hydrogen fluoride in gaseous mixtures. J. Scient. Instr. 36: 240–242 (1955).

Figure 2:
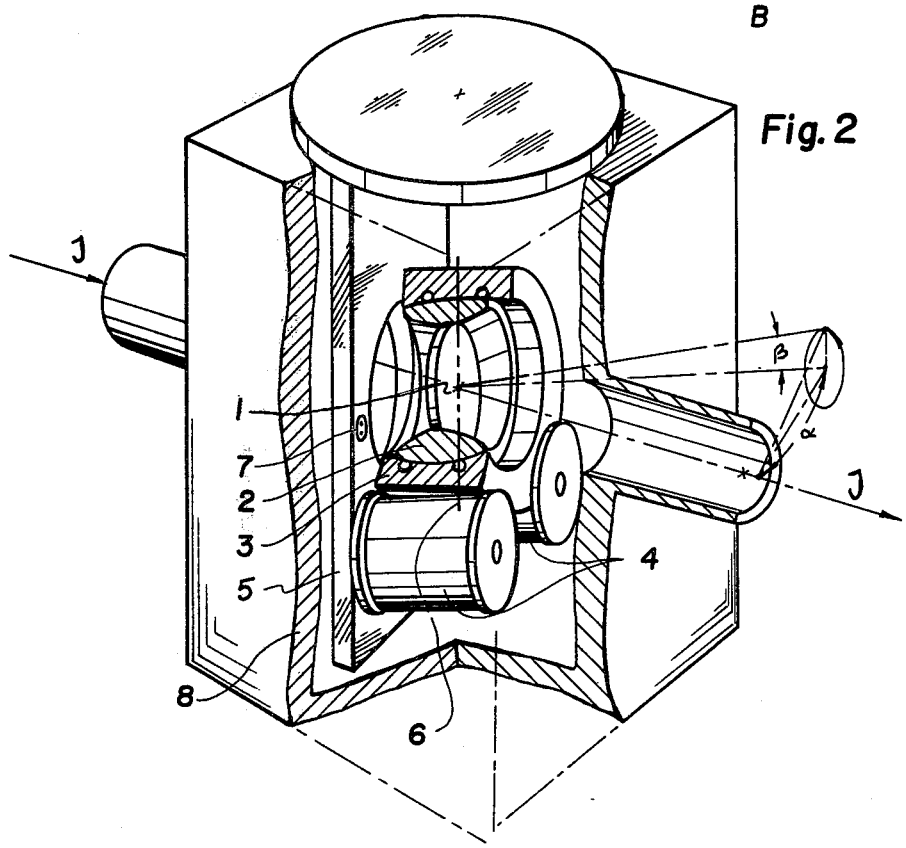
FIG. 2 is a perspective view partly in section, of a radiation modulator constructed in accordance with the invention.

In the arrangement shown (partially in section) in FIG. 2 the mean angle of incidence as well as the amplitude of the angle of incidence are adjustable. The interference filter (1) is mounted for universal pivotal movement in a fixable ball and socket joint (2), which is arranged in a ring (3) which runs between motor-driven rollers (4) (e.g. rotors or external rotor motors). The rollers rotatably mounted on a wall (5) which can be pivoted about an axis (6). By means of the axis (6) the angle alpha, and by means of the fixable ball and socket joint (2) the angle beta are adjustable. A contactor (7) furnishes the reference frequency for a phase-sensitive processing of wavelength dependent signals. The entire arrangement is contained in a lightproof housing (8), which has openings for the beam J-J.

An advantage of this special arrangement consists in that the ratio of the speed of the motor to the speed of the filter is freely selectable, and therefore also when using synchronous motors a modulation frequency can be adjusted which is aliguant with the line frequency and which therefore causes no disturbance in the amplification of wavelength-dependent signals. Alternatively, the interference filter may be arranged in the hollow axle of a belt driven ring bearing or directly in the hollow shaft of a ring motor, fixed or adjustable.

The described apparatus further has the metrological advantage that the wave number of the modulated radiation obeys with high accuracy the formula $$\nu = \nu_M + \Delta\nu \sin \omega t \tag{7}$$

Here nu is the instantaneous wave number of the transmission maximum of the filter, $\nu_M$ the mean of nu, $\Delta$ the modulation amplitude (amount of the maximum deviation from $\nu_M$ obtained by the modulation, omega the angular velocity of the rotation, and t is time.

Further advantages of the described apparatus consist in that in the optical system no irregular movement and hence no vibration (shaking) occurs and that irregularities of the drive can have no effect on the modulation amplitude. Disturbance due to frequency fluctuations need not be feared with the usual processing of the signal by means of phase-sensitive amplifiers (lock-in amplifiers).

By narrow-band interference filters are understood optical interference filters consisting of thin layers applied on radiation-transmitting substrates, which transmit radiation of the optical electromagnetic spectrum in a frequency range which is narrow in comparison with the shift of the transmission maximum of the filter obtained by the modulation. The modulation amplitude should be a multiple of the half-value width of the filter. Narrow-band interference filters are available for a variety of positions of the transmission maxima; their construction and their mechanism of action are known.

Figure 3:
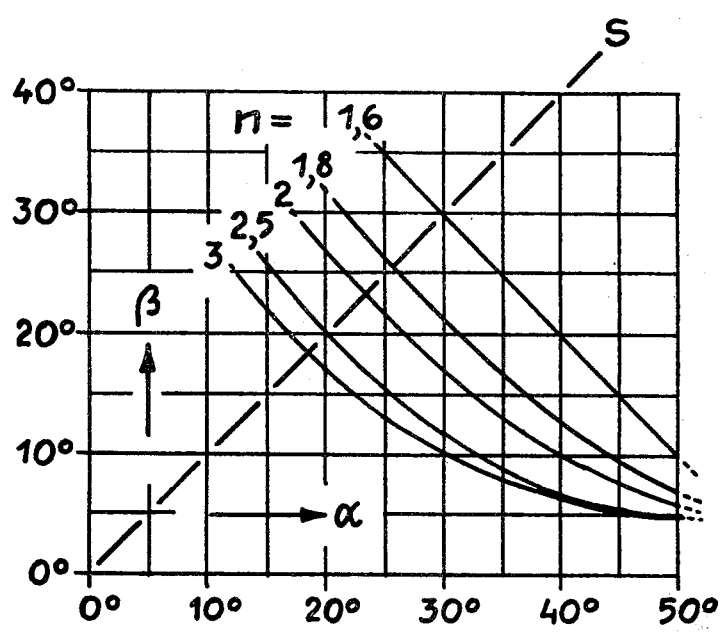
FIG. 3 is a curve of the maximum values of the angles alpha and beta for different interference filters.

The functional relationship between the wave number nu of the transmission maximum and the angle of incidence gamma obeys, as is known, the formula $$\nu = \nu_N / \sqrt{1 - (\sin \gamma)^2 / n^2} \tag{8}$$

where $\nu_N$ is the wave number of the transmission maximum at perpendicular incidence of light (gamma=0). The constant n of this formula depends on the construction of the interference filter. It can be determined by measurements of nu at different angles of incidence gamma, an amount between 1.4 and 3 being obtained as a rule. With an interference filter whose constant n is between 1.4 and 1.6, the time dependence of the wave number obeys in the method according to the invention the sine function (equation 7) with high accuracy also at large angles alpha and beta. If, however, the constant n is ≥1.6, it is advisable when adjusting the angles alpha and beta to take into account the deviation from the sine function regarded as permissible. As an example there are shown in FIG. 3 the maximum values of the angles alpha and beta for different interference filters with the constants n=1.6/1.8/2/2.5/3, for the case that the time dependence of the wave number must not deviate from the sine function by more than about ±1% of the modulation amplitude $\Delta\nu$. If, for instance, n=1.6 and alpha=40°, one should select beta ≤20°. The greatest modulation amplitudes result with alpha=beta, that is, with alpha=beta=20° for example for n=2.5. These amounts correspond in FIG. 3 to the straight line OS, which forms the axis of symmetry of the diagram.

The realization that only if beta<alpha is the amplitude $\Delta\nu$ given by the angle beta and the mean value $\nu_M$ adjustable with the angle alpha deserves special attention. If, however, alpha<beta, the mean value $\nu_M$ is not adjustable by the angle alpha, as additional tests have clearly shown.

In the method according to the invention, therefore, it is important to see to it that the condition beta<alpha is always fulfilled. To prevent adjusting an angle alpha<beta and obtaining a wrong result, a stop which prevents the adjustment of smaller angles alpha may, for example, be applied at the point alpha=beta. This is expedient above all in the embodiment shown in FIG. 2, where the axis of rotation O-C (FIG. 1) is at right angles to the setting axis 6 (FIG. 2). If, however, the axis of rotation forms with the setting axis an angle delta=45−beta or, better still, delta=30−beta, then the mentioned condition beta<alpha will always be fulfilled even without need of a stop and at the same time an enlargement of the adjustment range is obtained.

Figure 4A:
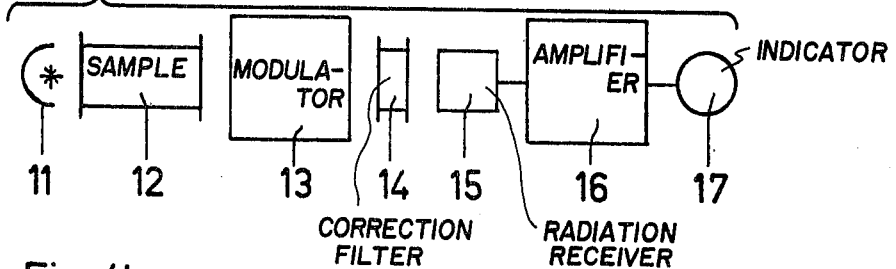
FIGS. 4a and 4b are schematic representations of two different embodiments of test setup for carrying out the method of the invention.
Figure 4B:
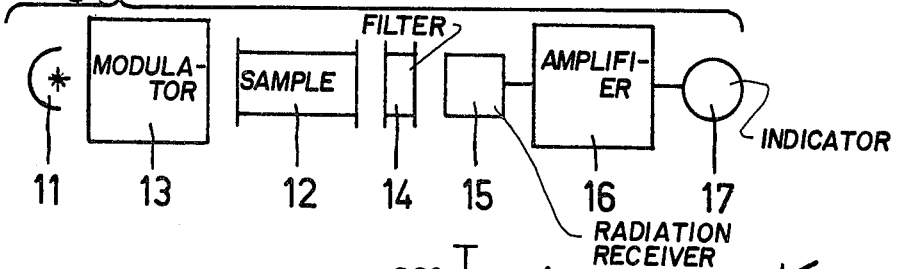

The test setup is illustrated schematically in FIG. 4. 11 is a radiation source, 12 a sample, 13 a modulator with adjustable angle alpha, 14 a correction filter, 15 a radiation receiver, 16 an amplifier, and 17 a signal indication for the zero crossing of the first derivative J'. The structural elements may be arranged in the order 11-12-13-14-15 as shown in FIG. 4a or in the order 11-13-12-14-15 a shown in FIG. 4b.

As an example there is described below—because of its great importance with respect to environmental protection—the determination of the quantity ratio CO:-CO$_2$.

CO and CO$_2$ have in the infrared range at 2143 and 2349 cm$^{-1}$ very strong absorption bands, each dividing into two branches. The adjacent branches of the absorption bands of the two substances can be used for the determination of the quantity ratio according to the invention.

Into the modulator (FIG. 2 or position 13 in FIG. 4) an interference filter was inserted, which at perpendicular incidence of light had a transmission maximum at 2175 cm$^{-1}$ and a half value width of 71 cm$^{-1}$. The filter normal formed with the axis of rotation an angle beta=9.1°. To compensate the zero signal (according to equation 5) an exactly metered quantity of CO was enclosed gas-proof in a filter cuvette 14 (FIG. 4).

Figure 5:
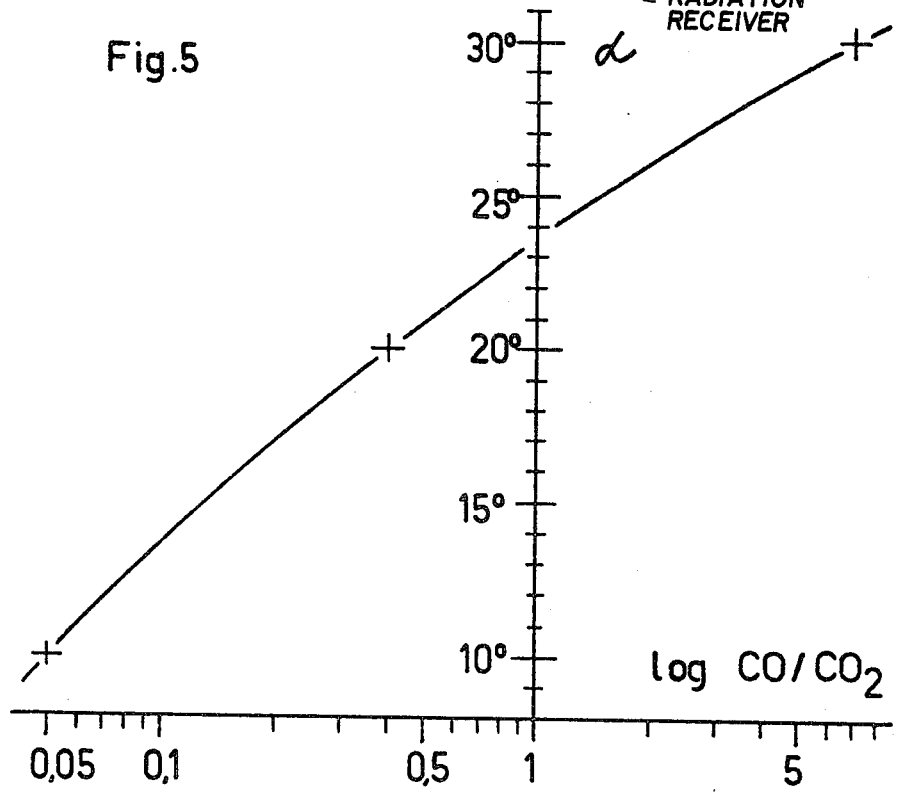
FIG. 5 indicates a curve for compensating the zero signal of an exactly metered quantity of carbon monoxide.

For the empirical determination of the functional relationship between the angle alpha and the CO/CO$_2$ ratio, calibration gas was admitted in the measuring cuvette 12 under different mixture ratios (FIG. 4) and the angle alpha at which a zero crossing of the signal 17 (FIG. 4) was observable was measured and plotted as a calibration curve in FIG. 5. On the axis of the abscissae is shown the CO/CO$_2$ ratio on a logarithmic scale, on the axis of the ordinate is shown the angle alpha on a linear scale.

The new method for determining the concentration ratio of two components has an extremely broad area of application. It is not limited to the gaseous state represented in the example, but can be employed also for liquid and solid solutions, such as glasses, which have an absorption minimum suitable for the measurement. This absorption minimum need not be located in the infrared, but may of course also lie in the visible or ultraviolet spectral range.

The subject matter with which the invention is concerned is found in the following literature:

French Pat. No. 1,088,334

J. A. Harrison and C. D. Reid, Infra-red absorptiometer, using interference filters for analysis of hydrogen fluoride in gaseous mixtures. J. Scient. Instr. 36: 240–242 (1955).

G. Bonfigliolo and P. Provetto. Principles of Self-Modulating Derivative Optical Spectroscopy. Appl. Optics 3 (12) 1417–24 (1964).

R. N. Hager, Jr. and R. C. Anderson. Theory of the Derivative Spectrometer. J. Opt. Soc. Amer. 60 (11) 1444–1449 (1970).

H. A. MacLeod. Thin-Film Optical Filters, 332 pp.

U.S. Pat. No. 2,834,246.

While specific embodiments of the invention have been shown and described in detail to illustrate the application of the principles of the invention, it will be understood that the invention may be embodied otherwise without departing from such principles.

What is claimed is:

1. Method for determining the quantity ratio of two components of a multi-substance mixture, whose absorption bands are adjacent to each other and overlap, using an interference filter comprising rotating an interference filter in a uniform rotation about a first axis through the filter plane which forms with a perpendicular erected on the filter plane a fixed angle beta≠0, and which is rotatably arranged about a second axis through the filter plane, adjusting the angle (alpha) which the axis of rotation forms with the ray in the range beta<alpha so that a signal corresponding to the first derivative of the spectral intensity distribution of the radiation transmitted by the substance mixture just passes through zero, and using a quantity correlated with this angle as measure of the quantity ratio.

2. A radiation modulator for determining the quantity ratio of two components of a multi-substance mixture, comprising a housing having an opening for the passage of a ray therethrough, an interference filter in said housing in the path of said ray, means mounting said filter for rotation about a first axis comprising the axis of said filter and for pivoting said filter about a second axis also going through said filter, said first axis being such that the area normal thereof forms with said first axis a fixed angle beta, said first axis being rotatable about said second axis, the angle alpha being formed between said first axis in the ray direction, means for indicating said angle alpha, said filter being adjustable to vary said angle alpha.

3. An apparatus according to claim 2, wherein said first axis forms with said second axis an angle delta which is equal to or less than 45° minus angle beta.

4. An apparatus according to claim 2, including means for varying the angle alpha and for recording the zero crossings.

* * * * *